(12) United States Patent
Liu et al.

(10) Patent No.: US 12,038,211 B2
(45) Date of Patent: Jul. 16, 2024

(54) CONTINUOUS HEATING CONTROL SYSTEM AND METHOD, AND AIR-CONDITIONING DEVICE

(71) Applicant: Gree Electric Appliances, Inc. of Zhuhai, Guangdong (CN)

(72) Inventors: Hua Liu, Guangdong (CN); Shiqiang Zhang, Guangdong (CN); Limin Li, Guangdong (CN); Chao Zhou, Guangdong (CN); Mengmeng Jin, Guangdong (CN); Shiqiang Zhu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 282 days.

(21) Appl. No.: 17/641,713

(22) PCT Filed: Sep. 3, 2020

(86) PCT No.: PCT/CN2020/113188
§ 371 (c)(1),
(2) Date: Mar. 9, 2022

(87) PCT Pub. No.: WO2021/077915
PCT Pub. Date: Apr. 29, 2021

(65) Prior Publication Data
US 2022/0412621 A1  Dec. 29, 2022

(30) Foreign Application Priority Data
Oct. 23, 2019 (CN) .......................... 201911014181.2

(51) Int. Cl.
*F25B 47/02* (2006.01)
*F25B 13/00* (2006.01)

(52) U.S. Cl.
CPC ............ *F25B 47/022* (2013.01); *F25B 13/00* (2013.01); *F25B 2313/008* (2013.01);
(Continued)

(58) Field of Classification Search
CPC .... F25B 47/022; F25B 13/00; F25B 2347/02; F25B 2313/008; F25B 2400/01; F25B 2400/23; F25B 2400/13
See application file for complete search history.

(56) References Cited

U.S. PATENT DOCUMENTS

| 4,215,555 A | 8/1980 | Cann et al. |
| 10,024,588 B2 | 7/2018 | Tamura et al. |
| 2014/0245766 A1 | 9/2014 | Wakamoto et al. |

FOREIGN PATENT DOCUMENTS

| CN | 2816701 Y | 9/2006 |
| CN | 101086405 A | 12/2007 |

(Continued)

OTHER PUBLICATIONS

European Patent Office, Extended European Search Report, Aug. 26, 2022.

*Primary Examiner* — Lionel Nouketcha
(74) *Attorney, Agent, or Firm* — The Webb Law Firm

(57) ABSTRACT

A continuous heating control system and method, and an air-conditioning device. The system includes a defrosting solenoid valve (1) arranged on a bypass pipeline, wherein one end of the bypass pipeline is connected to an oil separator (2), and the other end of the bypass pipeline is connected to an outdoor heat exchanger (3); and a heating structure which is arranged at the bottom of a gas separator (4) and used for heating the gas separator (4).

11 Claims, 3 Drawing Sheets

(52) U.S. Cl.
CPC ... *F25B 2347/02* (2013.01); *F25B 2400/0411* (2013.01); *F25B 2400/23* (2013.01)

(56) References Cited

FOREIGN PATENT DOCUMENTS

| | | | |
|---|---|---|---|
| CN | 101338951 A | 1/2009 | |
| CN | 101476801 A | 7/2009 | |
| CN | 101539348 A | 9/2009 | |
| CN | 101858631 A | 10/2010 | |
| CN | 104011485 A | 8/2014 | |
| CN | 104634020 A | 5/2015 | |
| CN | 103727714 B | 10/2015 | |
| CN | 205403232 U * | 7/2016 | |
| CN | 205403232 U | 7/2016 | |
| CN | 106196792 A | 12/2016 | |
| CN | 106500213 A | 3/2017 | |
| CN | 107560217 A | 1/2018 | |
| CN | 109442788 A | 3/2019 | |
| CN | 109798701 A | 5/2019 | |
| CN | 110173941 A * | 8/2019 | F25B 41/04 |
| CN | 110173941 A | 8/2019 | |
| CN | 110173947 A | 8/2019 | |
| CN | 110645745 A | 1/2020 | |
| CN | 110645746 A | 1/2020 | |
| CN | 210154145 U | 3/2020 | |
| CN | 210154745 U | 3/2020 | |
| CN | 111102770 A | 5/2020 | |
| CN | 111102771 A | 5/2020 | |
| CN | 111102773 A | 5/2020 | |
| CN | 111288694 A | 6/2020 | |
| CN | 210801719 U | 6/2020 | |
| CN | 211739589 U | 10/2020 | |
| CN | 211739592 U | 10/2020 | |
| EP | 3517861 A1 | 7/2019 | |
| JP | 2006258343 A | 9/2006 | |
| KR | 1020090099612 A | 9/2009 | |
| WO | 2018054052 A1 | 3/2018 | |
| WO | 2019091240 A1 | 5/2019 | |

* cited by examiner

Control the defrosting solenoid valve to be turned on, control the supercooling solenoid valve to be turned on, control the liquid inlet valve to be turned on, control the exhaust valve to be turned on, control the heating electronic expansion valve to be turned off, and control the supercooler electronic expansion valve to be turned on to a maximum number of steps after receiving a defrosting start instruction — S501

Control the first electrical heating member to start operation — S502

Fig. 5

CONTINUOUS HEATING CONTROL SYSTEM AND METHOD, AND AIR-CONDITIONING DEVICE

CROSS-REFERENCE TO RELATED APPLICATIONS

The present application is a United States National Phase Application under 35 U.S.C. § 371 of International Patent Application No. PCT/CN2020/113188, filed on Sep. 3, 2020, and claims priority to Chinese Patent Application No. 201911014181.2 filed on Oct. 23, 2019, the disclosures of which are hereby incorporated by reference in their entirety.

BACKGROUND OF THE DISCLOSURE

The present disclosure relates to a continuous heating control system and method, and an air-conditioning device.

DESCRIPTION OF RELATED ART

At present, an air-conditioning device is becoming a heating device. For the air-conditioning device, the phenomenon of frosting and defrosting during heating operation may affect the operational comfort of the user.

When the air-conditioning device is in a heating operation, a refrigerant in an outdoor heat exchanger evaporates and absorbs heat, which may result in frosting on the outdoor heat exchanger. When it is seriously frosted, it will affect the heat exchange effect of the outdoor heat exchanger, which in turn affects the heating performance of the indoor unit.

SUMMARY OF THE DISCLOSURE

In an aspect of the present disclosure, a continuous heating control system is provided. The system comprises: a defrosting solenoid valve arranged on a bypass pipeline, wherein one end of the bypass pipeline is connected to an oil separator, and another end of the bypass pipeline is connected to an outdoor heat exchanger; and a heating structure arranged at a bottom of a gas separator and configured to heat the gas separator.

In another aspect of the present disclosure, an air-conditioning device is provided. The air-conditioning device comprises: the continuous heating control system described above.

In another aspect of the present disclosure, a continuous heating control method applied to the continuous heating control system is provided. The method comprises: controlling the defrosting solenoid valve to be turned on, controlling a supercooling solenoid valve to be turned on, controlling a liquid inlet valve to be turned on, controlling an exhaust valve to be turned on, controlling a heating electronic expansion valve to be turned off, and controlling a supercooler electronic expansion valve to be turned on to a maximum number of steps after receiving a defrosting start instruction; and controlling a first electrical heating member to start operation; wherein the supercooling solenoid valve is arranged between a gas separator and a supercooler, and the heating electronic expansion valve is arranged between the supercooler and the outdoor heat exchanger.

In another aspect of the present disclosure, a computer-readable storage medium is provided. The computer-readable storage medium has a computer program stored thereon, wherein the program, when executed by a processor, implements the above-described method.

BRIEF DESCRIPTION OF THE DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description with reference to the accompanying drawings, in which:

FIG. 5 is a flowchart of a continuous heating control method according to some embodiments of the present disclosure.

Figure 1:
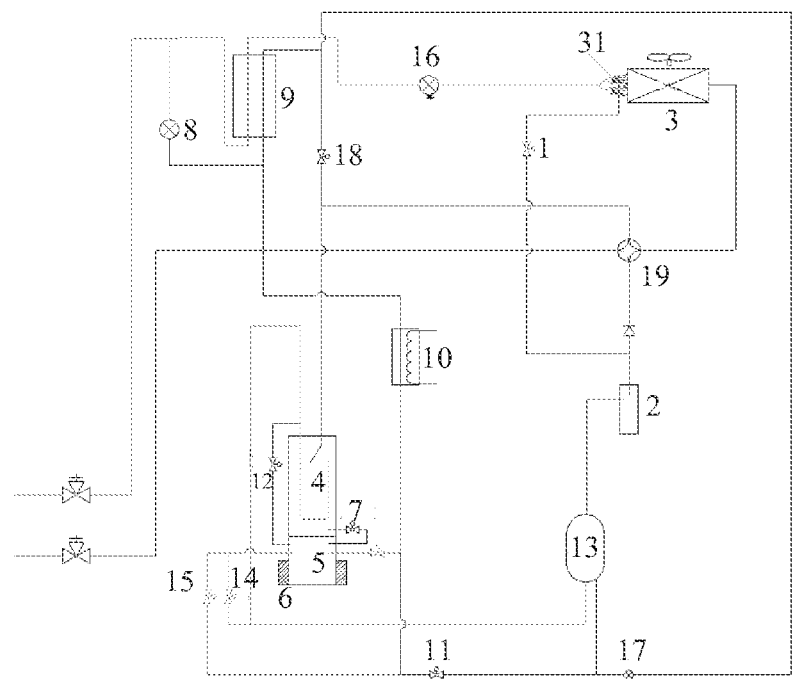
FIG. 1 is a schematic structural view of a continuous heating control system according to some embodiments of the present disclosure.

It should be understood that the dimensions of various parts shown in the accompanying drawings are not necessarily drawn according to actual proportional relations. In addition, the same or similar components are denoted by the same or similar reference signs.

DETAILED DESCRIPTION

In order to make the object, technical solution and advantages of the present disclosure more explicit, the present disclosure will be described in detail in some embodiments below in conjunction with the accompanying drawings. Apparently, the described embodiments are only some of, rather than all of the embodiments of the present disclosure. Based on the embodiments in the present disclosure, all the other embodiments obtained by those of ordinary skill in the art without an inventive effort fall within the protection scope of the present disclosure.

The terms used in the embodiments of the present disclosure are for the purpose of describing particular embodiments only, but not intended to limit the present disclosure. As used in the embodiments of the present disclosure and the appended claims, the singular forms "a", "the" and "this" are also intended to comprise plural forms, unless explicitly denoted in the context otherwise, and "a plurality of" generally contains at least two.

It should be understood that the term "and/or" used herein is only an associated relationship to describe associated objects, which indicates that there may be three relationships, for example, A and/or B, which may indicate such three cases that A is present alone, A and B are present at the same time, or B is present alone. In addition, the character "/" herein generally indicates that the associated objects in the context are in an "or" relationship.

Depending on the context, the words "if" and "in the case of" as used here may be construed as "during . . . " or "when . . . " or "in response to determining" or "in response to detecting". Similarly, depending on the context, the phrases "if determined" or "if (the stated condition or occurrence) is detected" may be construed as "when determined" or "in response to determining" or "when (the stated condition or occurrence) is detected)" or "in response to detecting (the stated condition or occurrence)".

It should also be noted that, the terms "comprising", "including" or any other variation thereof are intended to encompass a non-exclusive inclusion such that a product or device comprising a series of elements not only comprises those elements, but also comprises other elements not explicitly listed, or alternatively comprises inherent elements of such product or device. In the case where a further restriction is not made, an element delimited by the phrase "comprising a . . . " does not exclude the presence of additional identical elements in the product or device that comprises said element.

In the air-conditioning device known by the inventors of the present disclosure, when it is detected that the outdoor heat exchanger is seriously frosted, the unit may switch a four-way valve, so that the high-temperature and high-pressure refrigerant from an exhaust port of a compressor enters the outdoor heat exchanger to provide heat for defrosting. However, at this time, the indoor unit is in a cooling state, so that the indoor temperature will drop, thereby affecting the comfort.

In view of the above-described problems, in the related art, an efficient and reliable continuous heating control method is provided to implement that the four-way valve is not switched during defrosting, and the indoor unit performs continuous heating. For example, a continuous heating control method known by the inventors of the present disclosure is a defrosting method by dividing the outdoor unit into areas. That is, the outdoor heat exchanger is divided into two areas which take turns to perform defrosting when defrosting is required, so that the indoor unit may continue to maintain a heating state.

The inventors of the present disclosure have found that, there might be drawbacks in the defrosting method by dividing the outdoor unit into areas. For example, during defrosting, a heat exchange area on an evaporation side of the air-conditioning device becomes smaller, and a heat exchange area on a condensation side becomes larger, which may make the heating effect of the indoor unit worse. In addition, the divided areas take turn to perform defrosting, which may also make the defrosting time longer. Therefore, the defrosting method by dividing the outdoor unit into areas might be present with the problem of slow defrosting and attenuated heating capacity.

In view of this, the embodiments of the present disclosure provide a continuous heating control system, so as to achieve the effect of no attenuation of heating capacity and fast defrosting as much as possible. The alternative embodiments of the present disclosure will be described in detail below in conjunction with the accompanying drawings.

FIG. 1 is a schematic structural view of a continuous heating control system according to some embodiments of the present disclosure. As shown in FIG. 1, in the system, a bypass pipeline is added on the basis of the known heat pump system. The system comprises a defrosting solenoid valve 1 and a heating structure. The defrosting solenoid valve 1 is arranged on the bypass pipeline, wherein one end of the bypass pipeline is connected to an oil separator 2, and another end of the bypass pipeline is connected to an outdoor heat exchanger 3. For example, one end of the defrosting solenoid valve 1 may be directly connected to a front portion or a rear portion of a capillary tube 31 of the outdoor heat exchanger 3. The heating structure is arranged at a bottom of a gas separator 4 and is configured to heat the gas separator 4. The heating structure comprises a heating tank 5. The heating tank 5 is arranged at the bottom of the gas separator 4. A first pipeline connected to the heating tank 5 is provided at the bottom of the gas separator 4. The heating structure also comprises a first electrical heating member 6. The first electrical heating member 6 is arranged outside the heating tank. The first pipeline is provided with a liquid inlet valve 7.

In the above-described continuous heating control system, a bypass pipeline is provided, wherein one end of the bypass pipeline is connected to an oil separator, and another end of the bypass pipeline is connected to an outdoor heat exchanger, wherein a defrosting solenoid valve is provided on the bypass pipeline, and a heating structure is provided at a bottom of a gas separator, the heating structure is configured to heat the gas separator. This can achieve the effect of no attenuation of heating capacity and fast defrosting as much as possible.

In some embodiments, the system further comprises: a first branch, wherein a first end of the first branch is arranged in a pipeline between a rear end of a supercooler electronic expansion valve (i.e., a supercooler EXV) 8 and a supercooler 9, and a second end of the first branch is connected to an enthalpy increasing tube. The first branch is provided with a second electrical heating member 10 and a first enthalpy increasing valve 11. A third end of the first branch is arranged between the second electrical heating member 10 and the first enthalpy increasing valve 11 and is connected to the heating tank 5.

In some embodiments, the system may further comprise: a second pipeline connected between an outlet pipe of the gas separator 4 and the heating tank 5. The second pipeline is provided with a pressure balancing valve 12. The system further comprises:

a third pipeline, wherein one end of the third pipeline is connected to the heating tank 5, and another end of the third pipeline is connected to two branches. One branch of the two branches is connected to a suction pipe of a compressor 13, and the one branch is provided with an exhaust valve 14. The other branch of the two branches is connected to the enthalpy increasing tube, and the other branch is provided with a second enthalpy increasing valve 15. The branch connected to the suction pipe of the compressor 13 is provided with the exhaust valve 14, and the branch connected to the enthalpy increasing tube is provided with the second enthalpy increasing valve 15. In the system of FIG. 1, a pipeline between the outdoor heat exchanger 3 and the supercooler 9 is provided with a heating electronic expansion valve (i.e., a heating EXV) 16. A pipeline from the first enthalpy increasing valve 11 to the supercooler 9 is provided with a jet enthalpy electronic expansion valve (i.e., a jet enthalpy EXV) 17. A pipeline from the supercooler 9 to the gas separator 4 is provided with a supercooling solenoid valve 18. Additionally, as shown in FIG. 1, the system further comprises a four-way valve 19.

The technical solution of the present disclosure is applied to use the hot air bypass and gas separation heating technology, so that the high-temperature and high-pressure refrigerant exiting from the exhaust may be directly guided to the outdoor heat exchanger for defrosting and to the indoor heat exchanger for heating during defrosting. The condensed refrigerant directly enters the gas separator, and then enters the heating tank from the gas separator so as to be heated and evaporated within the heating tank, so that it is possible to maintain that the heating capacity is not attenuated. The above-described system of the present disclosure can achieve the effect of no switch of the four-way valve, no attenuation of heating capacity and fast defrosting during defrosting.

Figure 2:
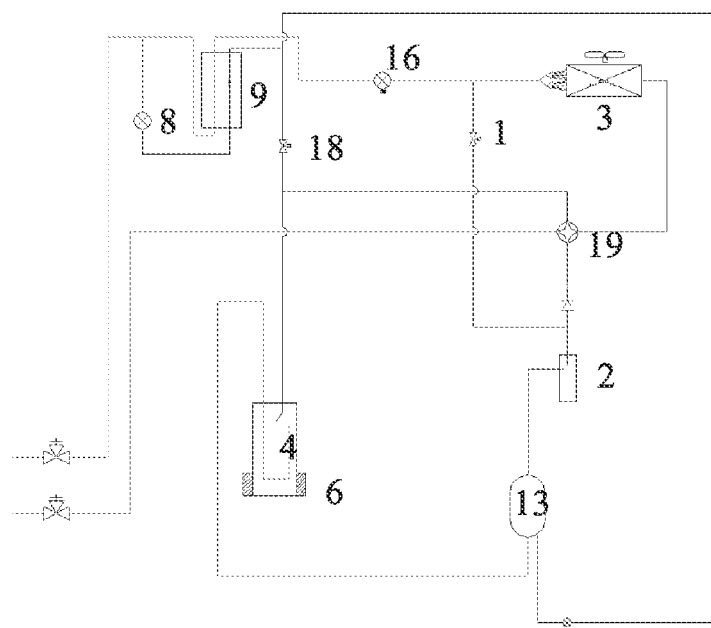
FIG. 2 is another schematic structural view of a continuous heating control system according to some embodiments of the present disclosure.

FIG. 2 is another schematic structural view of the continuous heating control system according to some embodiments of the present disclosure. As shown in FIG. 2, the bypass pipeline exiting from the exhaust pipe of the compressor 13 is connected to the front portion of the capillary tube of the outdoor heat exchanger 3. At this time, the inflowing refrigerant is throttled by the capillary tube before entering the heat exchanger for defrosting. The electrical heating member 6 is directly arranged at the bottom of the gas separator, or is arranged at an inlet pipe or an outlet pipe of the gas separator. That is, in some embodiments, the heating structure comprises: a third electrical heating member 6 arranged at the bottom of the gas separator, or at the inlet pipe of the gas separator, or at the outlet pipe of the gas separator. However, in comparison, the flow of the refrigerant can be adjusted by using the heating tank.

Based on the above-described analysis, it is known that in some embodiments of the present disclosure, a bypass pipeline is added on the basis of the known heat pump system, with one end of the bypass pipeline connected to the oil separator exiting 2 from the exhaust pipe of the compressor, and the other end of the bypass pipeline connected to the capillary tube of the outdoor heat exchanger. The bypass pipeline is provided with a defrosting solenoid valve 1. Furthermore, a branch (i.e., the first branch) is added, with a first end of the branch provided in the pipeline between the rear end of the supercooler electronic expansion valve and the supercooler. The branch is provided with an electrical heating member 10 (i.e., the above-described second electrical heating member 10) and an enthalpy increasing valve 11 (i.e., the above-described first enthalpy increasing valve 11). A third end of the branch enters the heating tank 5 below the gas separator 4, and a second end of the branch is connected to the enthalpy increasing tube. The heating tank 5 is provided below the gas separator 4, and an electrical heating member 6 (i.e., the above-described first electrical heating member 6) is provided outside the heating tank 5. A pipeline connected to the heating tank 5 is arranged at the bottom of the gas separator 4, and a liquid inlet valve 7 is provided in the pipeline. A pipeline is connected between the outlet pipe of the gas separator 4 and the heating tank 5, and a pressure balancing valve 12 is provided in the pipeline. Another pipeline exiting from the heating tank 5 is connected to two branches, wherein one branch of the two branches is connected to the suction pipe of the compressor and is provided with an exhaust valve 14, and the other branch of the two branches is connected to an enthalpy increasing tube and is provided with an enthalpy increasing valve 15 (i.e., the above-described second enthalpy increasing valve 15).

The embodiments also provide an air-conditioning device, comprising the continuous heating control system introduced above. The air-conditioning device uses the hot air bypass and gas separation heating technology, so that the high-temperature and high-pressure refrigerant exiting from the exhaust can be directly guided to the outdoor heat exchanger for defrosting and to the indoor heat exchanger for heating during defrosting. The condensed refrigerant directly enters the gas separator, and then enters the heating tank from the gas separator. The refrigerant is heated and evaporated within the heating tank, so that it is possible to maintain that the heating capacity is not attenuated. The air-conditioning device can achieve the effect of no switch of the four-way valve 19, no attenuation of heating capacity and fast defrosting during defrosting.

Figure 3:
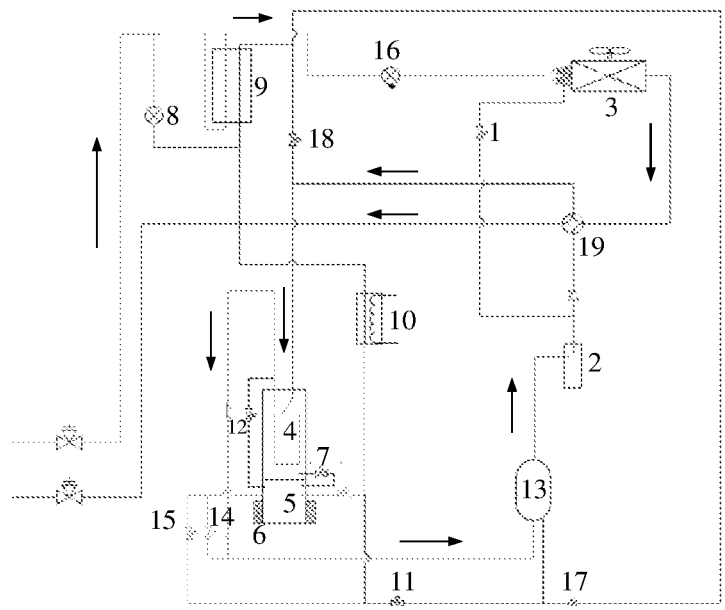
FIG. 3 is a schematic view of heating operation according to some embodiments of the present disclosure.

FIG. 3 is a schematic view of heating operation according to some embodiments of the present disclosure. As shown in FIG. 3, a direction of an arrow indicates a flow direction of the refrigerant. When the air-conditioning device is in heating operation, the four-way valve 19 is in a power-on state. After the compressor 13 compresses the refrigerant into high-temperature and high-pressure gas, the high-temperature and high-pressure gas passes through the oil separator 2, and then passes through the four-way valve 19, and leads to the indoor unit (not shown). After the refrigerant condenses and releases heat in the indoor unit, the refrigerant becomes a liquid and then returns to the outdoor unit. After the refrigerant returning from the indoor unit and passes through the supercooler 9, the refrigerant is throttled and depressurized by the heating electronic expansion valve 16 to become a low-temperature and low-pressure liquid, and then evaporates and absorbs heat in the outdoor heat exchanger 3 to become a gas. The gaseous refrigerant exits from the outdoor heat exchanger 3, passes through the four-way valve 19, enters the gas separator 4, and is sucked into the compressor 13 from the gas separator 4 for compression, thus completing a heating cycle.

Figure 4:
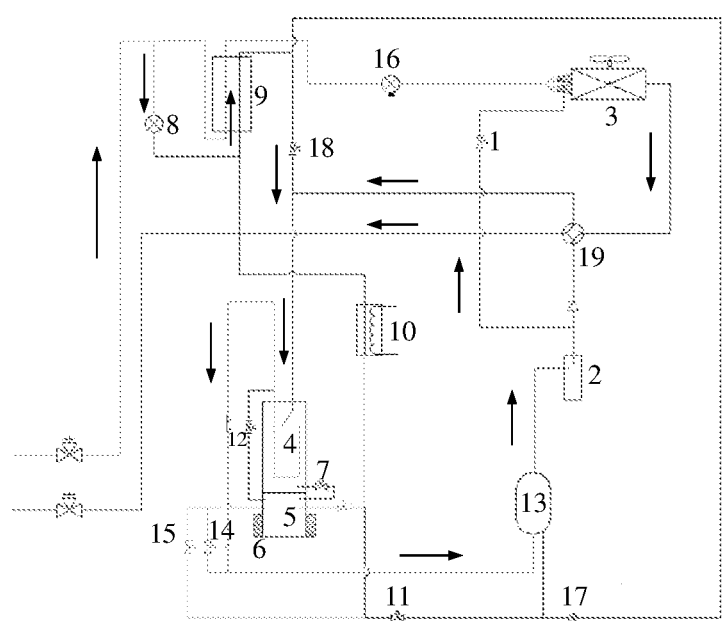
FIG. 4 is a schematic view of defrosting operation according to some embodiments of the present disclosure.

FIG. 4 is a schematic view of defrosting operation according to some embodiments of the present disclosure. As shown in FIG. 4, a direction of an arrow indicates a flow direction of the refrigerant. When the air-conditioning device receives a defrosting instruction, the defrosting solenoid valve 1 is turned on, the supercooling solenoid valve 18 is turned on, the liquid inlet valve 7 is turned on, the exhaust valve 14 is turned on, the heating electronic expansion valve 16 is turned off, the supercooler electronic expansion valve 8 is turned on to a maximum number of steps, and the electrical heating member 6 starts operation. At this time, the refrigerant compressed by the compressor 13 is divided into two paths, wherein one path still leads to the indoor unit (not shown) for heating, and the other path reaches the outdoor heat exchanger 3 through the bypass branch to defrosts the outdoor heat exchanger 3, and then enters the gas separator 4. The liquid refrigerant returned from the indoor unit no longer enters the outdoor heat exchanger 3, but directly passes through the supercooler 9 and then enters the gas separator 4. There is more liquid refrigerant entering the gas separator 4, the liquid refrigerant enters the heating tank 5 through the liquid inlet valve 7, become a gaseous refrigerant after evaporating and absorbing heat in the heating tank 5, exit from the exhaust valve 14, and enter the suction pipe of the compressor 13. After defrosting ends, the defrosting solenoid valve 1 is turned off, the liquid inlet valve 7 is turned off, and the exhaust valve 14 is turned off, the electrical heating member 6 stops operation, and the supercooling solenoid valve 18, the heating electronic expansion valve 16, and the supercooler electronic expansion valve 8 resume normal control.

During defrosting, since the gaseous refrigerant exiting from the compressor is required to heat the indoor unit and defrost the outdoor heat exchanger, a compressor frequency greater than a compressor frequency during normal heating operation may be applied to maintain the effect of heating and defrosting. The above-described method is different from the defrosting method in divided areas in that the heating member of the gas separator is used to enhance the heat exchange effect on the evaporation side of the system, so that the overall heating effect of the system is not attenuated.

FIG. 5 is a flowchart of a continuous heating control method according to some embodiments of the present disclosure. The continuous heating control method is applied to the above-described continuous heating control system. As shown in FIG. 5, the method comprises steps S501 to S502.

In step S501, the defrosting solenoid valve is controlled to be turned on, the supercooling solenoid valve is controlled to be turned on, the liquid inlet valve is controlled to be turned on, the exhaust valve is controlled to be turned on, the heating electronic expansion valve is controlled to be turned off, and the supercooler electronic expansion valve is controlled to be turned on to a maximum number of steps after a defrosting start instruction is received.

In step S502, the first electrical heating member is controlled to start operation.

The supercooling solenoid valve is arranged between the gas separator and the supercooler, and the heating electronic expansion valve is arranged between the supercooler and the outdoor heat exchanger.

In some embodiments, the method further comprises: controlling the defrosting solenoid valve to be turned off, controlling the liquid inlet valve to be turned off, controlling the exhaust valve to be turned off, and controlling the supercooling solenoid valve, the heating electronic expansion valve and the supercooler electronic expansion valve to all resume normal control after receiving a defrosting end instruction; and controlling the first electrical heating member to stop operation.

The embodiments use the hot air bypass and gas separation heating technology, so that the high-temperature and high-pressure refrigerant exiting from the exhaust is directly guided to the outdoor heat exchanger for defrosting and to the indoor heat exchanger for heating during defrosting. The condensed refrigerant directly enters the gas separator, and then enters the heating tank from the gas separator so as to be heated and evaporated within the heating tank, so that it is possible to maintain that the heating capacity is not attenuated. The method of the present disclosure can achieve the effect of no switch of the four-way valve, no attenuation of heating capacity and fast defrosting during defrosting.

The embodiments of the present disclosure provide a software for implementing the technical solution described in the above-described embodiments.

The embodiments of the present disclosure provide a non-transitory computer storage medium having computer-executable instructions stored thereon, wherein the computer-executable instructions can implement the continuous heating control method in any of the above-described method embodiments.

The above-described software is stored in the above-described storage medium, and the storage medium comprises but is not limited to: an optical disk, a floppy disk, a hard disk, a erasable memory, or the like.

In the present disclosure, a hot air bypass branch is added at the outlet pipe of the oil separator, and connected between the heating electronic expansion valve and the outdoor heat exchanger for defrosting. The branch is provided with a solenoid valve. The gas separator is provided with a heating tank configured to heat the gas separator to evaporate the liquid refrigerant during defrosting. The embodiments of the present disclosure can achieve the effect of no switch of the four-way valve, no attenuation of heating capacity and fast defrosting during defrosting, thereby avoid affecting the comfort as much as possible.

The device embodiments described above are merely illustrative, wherein the units described as separate members may or may not be physically separated, and the members displayed as units may or may not be physical units, that is, they may be located in one place, or may also be distributed on multiple network elements. Some or all of the modules thereof may be selected to achieve the object of the solution in this embodiment according to actual needs.

From the description of the above embodiments, those skilled in the art may clearly understand that each embodiment may be implemented by means of software plus a requisite general hardware platform, and certainly may also be implemented by hardware. Based on this understanding, the above-described technical solutions may be embodied in the form of a software product in essence or part that contributes to the known art. The computer software product may be stored in a computer-readable storage medium, such as ROM/RAM, magnetic disk, optical disk, or the like, and comprises several instructions so that the method described in each embodiment or some parts of the embodiment is implemented by a computer device (which may be a personal computer, a server, or a network device, etc.).

Finally, it should be noted that: the above embodiments are only intended to describe the technical solution of the present disclosure, rather than limiting the same. Although the present disclosure has been described in detail with reference with the foregoing embodiments, those of ordinary skill in the art should understand that, they may still amend the technical solution recited in each of the foregoing various embodiments, or make equivalent replacements to some technical features therein. However, such amendments or replacements do not make the essence of a corresponding technical solution depart from the spirit and scope of the technical solution of each of the embodiments of the present disclosure.

What is claimed is:

1. A continuous heating control system, comprising:
    a defrosting solenoid valve arranged on a bypass pipeline, wherein one end of the bypass pipeline is connected to an oil separator, and another end of the bypass pipeline is connected to an outdoor heat exchanger;
    a heating structure arranged at a bottom of a gas separator and configured to heat the gas separator, wherein the heating structure comprises: a heating tank arranged at the bottom of the gas separator, wherein a first pipeline connected to the heating tank is provided at the bottom of the gas separator, and a first electrical heating member arranged outside the heating tank; and
    a first branch, wherein a first end of the first branch is arranged in a pipeline between a rear end of a supercooler electronic expansion valve and a supercooler, a second end of the first branch is connected to an enthalpy increasing tube, the first branch is provided with a second electrical heating member and a first enthalpy increasing valve, and a third end of the first branch is arranged between the second electrical heating member and the first enthalpy increasing valve and is connected to the heating tank.

2. The continuous heating control system according to claim 1, wherein the first pipeline is provided with a liquid inlet valve.

3. The continuous heating control system according to claim 1, further comprising:
    a second pipeline connected between an outlet pipe of the gas separator and the heating tank, wherein the second pipeline is provided with a pressure balancing valve.

4. The continuous heating control system according to claim 1, further comprising:
    a third pipeline, wherein one end of the third pipeline is connected to the heating tank, and another end of the third pipeline is connected to two branches, one branch of the two branches being connected to a suction pipe of a compressor, and another branch of the two branches being connected to an enthalpy increasing tube.

5. The continuous heating control system according to claim 4, wherein the one branch connected to the suction pipe of the compressor is provided with an exhaust valve, and the other branch connected to the enthalpy increasing tube is provided with a second enthalpy increasing valve.

6. The continuous heating control system according to claim 1, wherein one end of the defrosting solenoid valve is connected to a front portion or a rear portion of a capillary tube of the outdoor heat exchanger.

7. The continuous heating control system according to claim 1, wherein the heating structure comprises:
a third electrical heating member arranged at the bottom of the gas separator, or at an inlet pipe of the gas separator, or at an outlet pipe of the gas separator.

8. An air-conditioning device, comprising: the continuous heating control system according to claim 1.

9. A continuous heating control method, applied to the continuous heating control system according to claim 1, comprising:
controlling the defrosting solenoid valve to be turned on, controlling a supercooling solenoid valve to be turned on, controlling a liquid inlet valve to be turned on, controlling an exhaust valve to be turned on, controlling a heating electronic expansion valve to be turned off, and controlling a supercooler electronic expansion valve to be turned on to a maximum number of steps after receiving a defrosting start instruction; and
controlling a first electrical heating member to start operation;
wherein the supercooling solenoid valve is arranged between a gas separator and a supercooler, and the heating electronic expansion valve is arranged between the supercooler and the outdoor heat exchanger.

10. The continuous heating control method according to claim 9, further comprising:
controlling the defrosting solenoid valve to be turned off, controlling the liquid inlet valve to be turned off, controlling the exhaust valve to be turned off, and controlling the supercooling solenoid valve, the heating electronic expansion valve and the supercooler electronic expansion valve to all resume normal control after receiving a defrosting end instruction; and
controlling the first electrical heating member to stop operation.

11. A non-transitory computer-readable storage medium having stored thereon a computer program which, when executed by a processor, implements the method according to claim 9.

* * * * *